United States Patent [19]

Ducote

[11] Patent Number: 5,147,103
[45] Date of Patent: Sep. 15, 1992

[54] UTILITY CAGE FOR A PICKUP TRUCK

[76] Inventor: Wayne E. Ducote, Rte. 1, Box 413-2, Cottonport, La. 71327

[21] Appl. No.: 749,959

[22] Filed: Aug. 26, 1991

[51] Int. Cl.$^5$ ............................................. B60R 5/04
[52] U.S. Cl. ..................................... 296/37.6; 119/17
[58] Field of Search ............... 296/37.6, 24.1; 119/17, 119/18

[56] References Cited

U.S. PATENT DOCUMENTS

| | | | |
|---|---|---|---|
| 3,475,046 | 10/1969 | Webster | 296/24.1 |
| 4,089,554 | 5/1978 | Myers | 296/24.1 |
| 4,564,216 | 1/1986 | Kinyon et al. | 280/770 |
| 4,762,085 | 8/1988 | Ondrasik | 119/17 |
| 4,819,582 | 4/1989 | Lichvar | 119/17 |
| 4,824,157 | 4/1989 | Nielson et al. | 296/100 |
| 4,828,312 | 5/1989 | Kinkel et al. | 296/37.6 |
| 4,909,188 | 3/1990 | Tominaga | 119/17 |
| 4,938,519 | 7/1990 | Schlachter | 296/37.6 |
| 5,018,778 | 5/1991 | Goble | 296/37.6 |

*Primary Examiner*—Robert R. Song
*Attorney, Agent, or Firm*—Harvey S. Hertz

[57] ABSTRACT

A utility cage for a pickup truck comprising a top wall secured to the pickup truck and a rear wall pivotally secured to the top wall at one end thereof. The top wall and the rear wall when mounted on the pickup truck forming an enclosed cage with the floor of the truck bed, the truck bed side walls and the rear end of the truck cab. The rear wall is formed of the plurality of parallel members. Rotatable locking handles are secured to the top wall and extend through the real wall parallel members. The rotatable handles, when in a first position, enable the cage rear wall to pivot upward and when in a second position cause the rear wall to be locked in a generally vertical position.

4 Claims, 2 Drawing Sheets

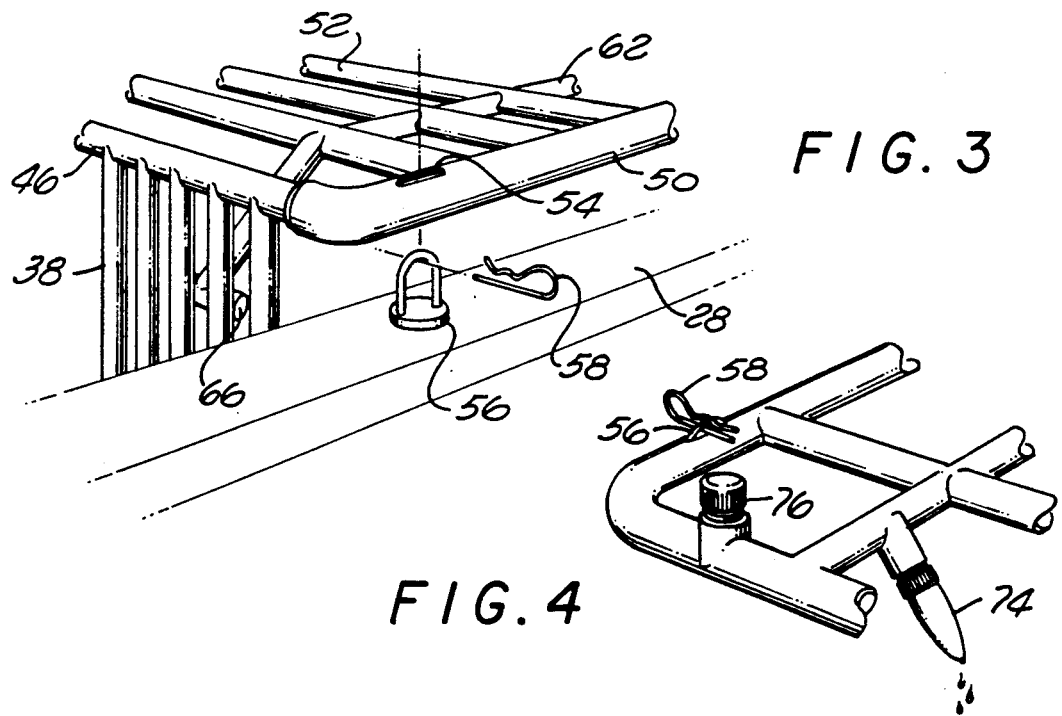
FIG. 3
FIG. 4
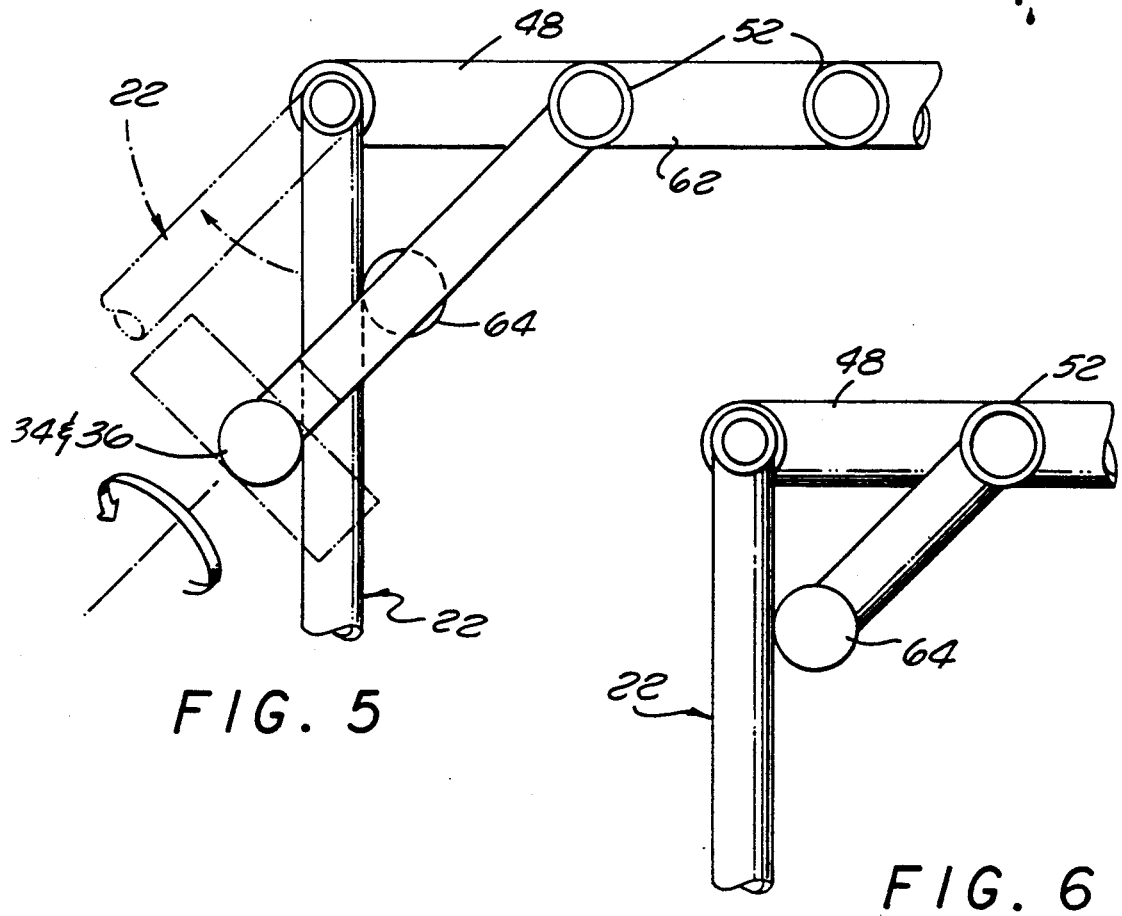
FIG. 5
FIG. 6

UTILITY CAGE FOR A PICKUP TRUCK

BACKGROUND OF THE INVENTION

1. Field of the Invention

The invention relates in general to utility cages for vehicles, and or particularly to a cage which can be mounted readily on a rear of a pickup truck bed for carrying animals or cargo in the truck bed.

2. Description of the Prior Art

Utility cages for vehicles such as a pickup truck are well-known. For example, U.S. Pat. No. 4,824,157 illustrates a utility cage which is mounted on the rear of the pickup truck and forms an enclosed cage. However, such a cage is complex, contains numerous parts, and is relatively expensive.

Other known prior art includes U.S. Pat. Nos. 4,819,582; 4,564,216; 4,909,188; and 4,762,085.

SUMMARY OF THE INVENTION

A utility cage for a pickup truck comprises a top wall secured to the truck bed and a rear wall pivotally secured to the top wall at one end thereof. The top wall and the rear wall when mounted on the pickup truck form an enclosed cage with the truck bed floor, side walls and rear end of the truck cab. The rear wall is formed of a plurality of parallel members. Rotatable locking handles are secured to the top wall and extend through the rear wall parallel members. The handles when in a first position enable the rear wall to pivot upwardly and when in a second position enable the rear wall to be locked in a generally vertical position to form an enclosed cage.

Unlike prior art cages, the present invention when combined with a truck bed contains two basic members, a top wall and a rear wall which can be easily installed and removed from the truck bed to form the enclosed cage.

The advantages of this invention both as to its construction and mode of operation, will be readily appreciated as the same becomes better understood by references to the following detailed description, when considered in connection with the accompanying drawings, in which like reference numerals designate like parts throughout the figures.

BRIEF DESCRIPTION OF THE DRAWINGS

FIG.3 is a partial perspective view illustrating the technique for securing the cage to the truck bed;

FIG.4 is a partial perspective view illustrating an alternative feature of the invention;

FIG.5 is a partial side view illustrating the opening and closing of the cage; and FIG.6 is a partial side view illustrating the cage operation.

DESCRIPTION OF THE PREFERRED EMBODIMENTS

Figure 1:
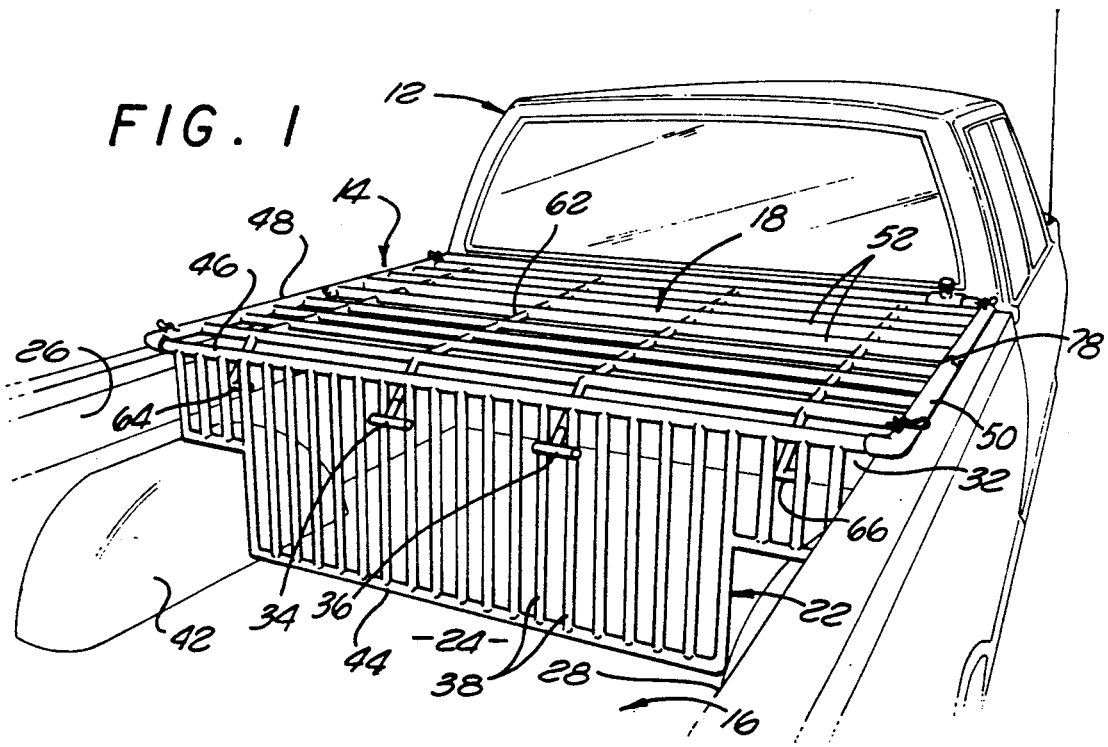
FIG.1 is a perspective view of the utility cage mounted on a pickup truck.

Referring now to the drawings, there is shown in FIG. 1 a pickup truck 12 having a utility cage 14 mounted thereon and constructed in accordance with principals of the invention. As can be readily seen in FIG.1, the utility cage 14 forms an enclosed area with the truck bed 16 of the pickup truck 12. This enclosed cage area is defined by a top wall 18 and a rear wall 22 of the cage as well as the truck bed floor 24, truck bed side walls 26 and 28 and the rear end 32 of the pickup truck cab.

Figure 2:
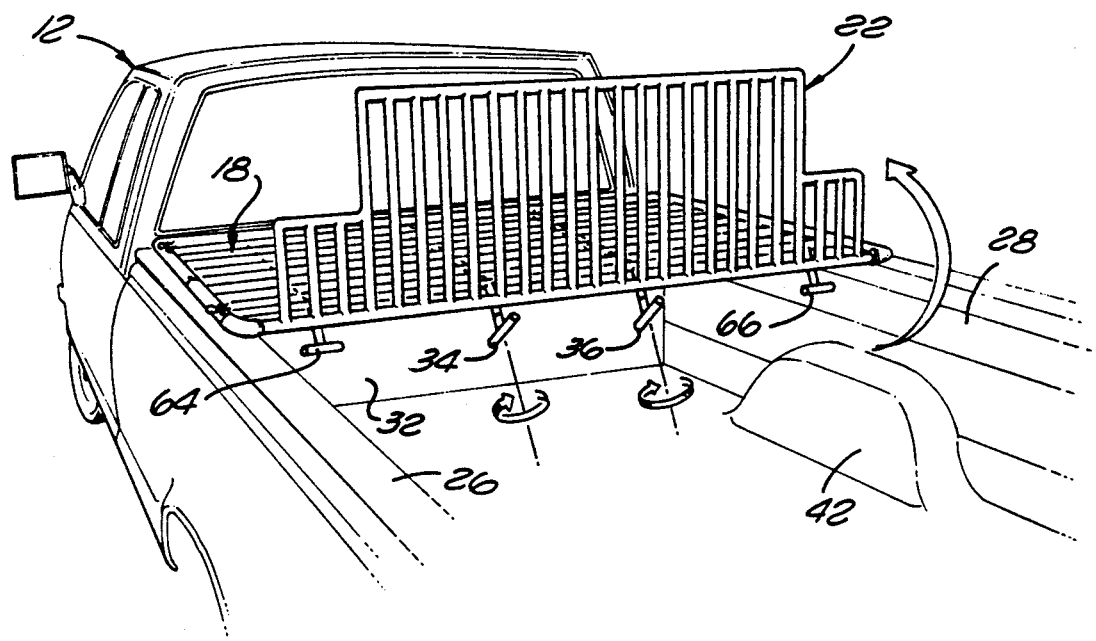
FIG.2 is a perspective view of a cage and pickup truck of FIG.1 showing the cage in an open position.

As illustrated in FIG.2, the rear wall 22 is pivotally movable upward in a direction as shown by the large arrow when a pair of locking handles 34 and 36 are rotated 90 degrees to planes perpendicular to the rear wall 22 plane as shown by the small arrows. The locking handles 34 and 36 are secured at one end thereof to the cage top wall 18 as will be explained in greater detail hereinafter.

The cage top wall 18 and rear wall 22 can be constructed of any material such as aluminum or plastic. In one embodiment polyvinyl chloride (PVC) piping was utilized for the top wall 18 and rear wall 22. The rear wall 22 contains a plurality of parallel members 38 which are of reduced height adjacent wheel covers 42 should the rear wall terminate adjacent the wheel covers. Each end of the vertical members 38 are secured to the parallel pair of transverse members 44 and 46, respectively. The top transverse member 46 (as shown in FIG. 1) is pivotally connected to the perimeter piping 48 and 50 of the top wall, forming a hinge for rotation of the rear wall 32 in the manner shown in FIG.2.

As seen in FIG. 1 the top wall 18 is formed of the plurality of parallel pipes 52 which extend across the width of the truck bed and terminate at opposite ends at perimeter piping 48 and 50, respectively. The perimeter piping 48 and 50 are mounted atop the truck bed side walls 26 and 28, respectively. As shown in greater detail in FIG. 3, the perimeter piping 48 and 50 contain slots 54 which enable a conventional pickup truck tie down 56 formed in a shape of the inverted U to pass therethrough. Then a cotter pin 58 is passed through the end of the tie down 56 and is utilized to secure the top wall 18 to the pickup truck side walls 26 and 28.

Referring again to FIGS. 1 and 2, the top wall 18 further contains transverse pipe members 62 which extend perpendicular to the parallel pipe members 52. These transverse pipe members 62 form additional support for maintaining the shape of the top wall 18 in a parallel plane and terminate at the rear end adjacent the rear wall 22. T-shaped handles 64 and 66, which are extensions of the outer pipe member 62, are fixed and terminated juxtaposed with the rear wall interior piping 38 as illustrated in FIG. 6 when the rear wall 32 is in a vertical position. The fixed handles 64 and 66 prevent the rear wall 22 from being pushed from a vertical position toward the top wall 18 lower surface.

The rotatable locking handles 34 and 36 form extensions of the inner tranverse pipes 62 and extend between adjacent rear wall vertical members 38 when the rear wall is in a vertical position and the cage is closed as shown in FIG. 1. The handles 34 and 36 are rotatable 90 degrees as illustrated in FIGS. 2 and 5 enabling the rear wall 22 to be rotated upwardly as shown in FIG. 2. The handles 34 and 36 when rotated to the position shown in FIG. 1, lock the rear wall 22 so that pivotal movement of the rear wall to the position shown in FIG. 2 is not possible. Thus, should an animal or packaging be contained within the cage defined area as illustrated in FIG. 1, movement of the animal or packaging from the cage is prevented.

The locking handles 34 and 36 can be spring loaded (not shown) so that the T-shaped handles 34 and 36 can be pulled away from the parallel members 38 on the rear wall and rotated to the position in FIG. 2. However, it has been found that rotation of the handles 34 and 36 are also possible by merely slightly bending the rear wall parallel members 38 adjacent the rotatable handle 34 and 36.

FIG. 4 illustrates an additional feature of the invention wherein the piping forming the top wall 18 can be used as a cavity for holding water and a water spout 74 connected to the piping can be used as an animal feeder. The water spout 74 is a conventional device which enables water to be dispensed as the animal licks on the spout. A cap 76 forms an entry to the water system and can be removed to add water to the system. It should be noted that the slot 54 must be sealed from the reservoir portion of the cage to prevent loss of water from the reservoir.

Referring again to FIG. 1, it should be noted that the perimeter pipes 48 and 50 are hinged at joints 78 enabling the top wall to be folded over once the rear wall is released by the rotatable handles 34 and 36.

I claim:

1. A utility cage for a pickup truck having a truck cab, a back wall of said truck cab being adjacent a truck bed of said pickup truck, said truck bed containing side panels and a floor, said utility cage comprising:

a fixed top wall mounted on the side panels of said pickup truck and extending rearwardly from the back wall of said cab; and a rear wall pivotally secured at the upper edge thereof to the rear edge of said top wall and forming an enclosed cage defined by the top wall, the rear wall, the truck bed side panels, the back wall of said truck cab and said truck floor bed.

2. A utility cage for a pickup truck in accordance with claim 1 wherein said rear wall contains a plurality of parallel members with rotatable locking handles secured to said top wall and extending through said parallel members, said handles when in a first position enabling said rear wall to pivot upwardly and when in a second position causing said rear wall to be locked in a generally vertical plane forming said enclosed cage.

3. A utility cage for a pickup truck in accordance with claim 2 and further comprises at least one fixed handle extending from said top wall to prevent said rear wall from moving from a vertical position toward said top wall bottom surface.

4. A utility cage in accordance with claim 1 wherein said top wall and said rear wall are formed of polyvinyl chloride hollow piping forming a liquid reservoir.

* * * * *